US012759134B2

(12) United States Patent
Jeung et al.

(10) Patent No.: US 12,759,134 B2
(45) Date of Patent: Oct. 13, 2026

(54) JOINT STRUCTURE AND EXO-SKELETON ROBOT INCLUDING THE SAME

(71) Applicants: Hyundai Motor Company, Seoul (KR); Kia Corporation, Seoul (KR)

(72) Inventors: Min Woong Jeung, Seoul (KR); Kyu Jung Kim, Seoul (KR); Ho Jun Kim, Gunpo-si (KR); Ju Young Yoon, Suwon-si (KR); Seong Taek Hwang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 935 days.

(21) Appl. No.: 18/158,041

(22) Filed: Jan. 23, 2023

(65) Prior Publication Data

US 2024/0075611 A1 Mar. 7, 2024

(30) Foreign Application Priority Data

Sep. 6, 2022 (KR) ........................ 10-2022-0113017

(51) Int. Cl.

*B25J 9/00* (2006.01)
*B25J 9/10* (2006.01)
*B25J 17/00* (2006.01)

(52) U.S. Cl.

CPC ............. *B25J 9/0006* (2013.01); *B25J 9/106* (2013.01); *B25J 17/00* (2013.01)

(58) Field of Classification Search

CPC .......... B25J 9/0006; A61F 2/581; A61H 1/02; A61H 1/0274; A61H 1/0281

See application file for complete search history.

(56) References Cited

U.S. PATENT DOCUMENTS

| | | | |
|---|---|---|---|
| 8,968,220 | B2 | 3/2015 | Han et al. |
| 9,440,362 | B2 | 9/2016 | Wang |
| 9,907,458 | B2 | 3/2018 | Schena |
| 11,007,107 | B2 | 5/2021 | Zoso et al. |
| 11,376,148 | B2 | 7/2022 | Kim et al. |

(Continued)

FOREIGN PATENT DOCUMENTS

| | | |
|---|---|---|
| JP | 2017024086 A | 2/2017 |
| KR | 20100069293 A | 6/2010 |

(Continued)

*Primary Examiner* — Brandy S Lee
*Assistant Examiner* — Mishal Zahra Hussain
(74) *Attorney, Agent, or Firm* — Slater Matsil, LLP

(57) ABSTRACT

An embodiment joint structure includes a first connection link configured to be fixed to one side of a wearer, a second connection link coupled to the first connection link to be rotatable about a first rotation axis, a third connection link coupled to the first connection link to be rotatable about a second rotation axis spaced apart from the first rotation axis, and a fourth connection link, a first side of which is coupled to the second connection link to be rotatable about a third rotation axis and a second side of which is coupled to the third connection link to be rotatable about a fourth rotation axis spaced apart from the third rotation axis, wherein an imaginary first extension axis, an imaginary second extension axis, an imaginary third extension axis, and an imaginary fourth extension axis intersect each other in an intersection area.

20 Claims, 7 Drawing Sheets

(56) References Cited

U.S. PATENT DOCUMENTS

| | | | | |
|---|---|---|---|---|
| 2011/0251533 | A1* | 10/2011 | Han | A63B 23/1245 601/33 |
| 2014/0378994 | A1 | 12/2014 | Wang | |
| 2020/0238542 | A1* | 7/2020 | Castro | A61H 1/0281 |
| 2020/0315830 | A1* | 10/2020 | Kim | A61F 5/013 |
| 2021/0161748 | A1* | 6/2021 | Kim | B25J 9/0006 |
| 2021/0290469 | A1* | 9/2021 | Van Engelhoven | A61H 1/0296 |
| 2022/0133579 | A1 | 5/2022 | Kang et al. | |

FOREIGN PATENT DOCUMENTS

| | | | | |
|---|---|---|---|---|
| KR | 101716761 | B1 | 3/2017 | |
| KR | 20200011736 | A | 2/2020 | |
| KR | 102142578 | B1 | 8/2020 | |
| KR | 20210069435 | A | 6/2021 | |
| KR | 20210154690 | A | 12/2021 | |
| KR | 20220060241 | A | 5/2022 | |
| WO | WO-2015058249 | A1 * | 4/2015 | A61H 1/0285 |

* cited by examiner

JOINT STRUCTURE AND EXO-SKELETON ROBOT INCLUDING THE SAME

CROSS-REFERENCE TO RELATED APPLICATIONS

This application claims the benefit of Korean Patent Application No. 10-2022-0113017, filed on Sep. 6, 2022, which application is hereby incorporated herein by reference.

TECHNICAL FIELD

The present disclosure relates to a joint structure and an exo-skeleton robot including the same.

BACKGROUND

An exo-skeleton robot that provides an assistant force to an upper arm of a user when the user performs an operation while wearing the robot on an upper body of the user is a robot that assists the user by providing a force that presses an arm of the user upwards. The exo-skeleton robot functions to assist a user when the user performs an operation in a posture of raising an arm, for example, performs an assembly operation below a vehicle.

This kind of an exo-skeleton robot is generally mounted on a shoulder of the user as well as an upper arm thereof. In this case, as the shoulder of the user is moved, the exo-skeleton robot also is moved. Motions of the exo-skeleton robot vary according to coupling relationships between links that constitute the exo-skeleton robot.

However, according to embodiments of the present disclosure, a sense of wearing significantly deteriorates because motions of the links according to a motion of the shoulder of the user are different from motions of a shoulder joint of the user in the exo-skeleton robot mounted on both of the shoulder and the upper arm of the user.

SUMMARY

The present disclosure relates to a joint structure and an exo-skeleton robot including the same. Particular embodiments relates to a joint structure that may provide an assistant force to a motion of a joint of a person and an exo-skeleton robot including the same.

Embodiments of the present disclosure can solve problems occurring in the prior art while advantages achieved by the prior art are maintained intact.

An embodiment of the present disclosure provides an exo-skeleton robot that has an ergonomic structure by implementing a motion that interworks a motion of a shoulder joint of a user.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a joint structure includes a first connection link fixed to one side of a wearer, a second connection link coupled to the first connection link to be rotatable about a first rotation axis, a third connection link coupled to the first connection link to be rotatable about a second rotation axis spaced apart from the first rotation axis, and a fourth connection link, one side of which is coupled to the second connection link to be rotatable about a third rotation axis and an opposite side of which is coupled to the third connection link to be rotatable about a fourth rotation axis spaced apart from the third rotation axis, and an imaginary first extension axis obtained by extending the first rotation axis, an imaginary second extension axis obtained by extending the second rotation axis, an imaginary third extension axis obtained by extending the third rotation axis, and an imaginary fourth extension axis obtained by extending the fourth rotation axis intersect each other in one area (here, 'an intersection area').

The second connection link and the third connection link may intersect each other.

The first connection link may be fixed to a shoulder of the wearer on a rear surface thereof when the wearer wears the joint structure.

The intersection area may be located on an acromioclavicular joint of the wearer when the wearer wears the joint structure.

The second connection link may be located above the first connection link in the first rotation axis, about which the second connection link is coupled to the first connection link to be rotatable, when the wearer wears the joint structure.

The third connection link may be located below the first connection link in the second rotation axis, about which the third connection link is coupled to the first connection link to be rotatable, when the wearer wears the joint structure.

The fourth connection link may be located below the second connection link in the third rotation axis, about which the fourth connection link is coupled to the second connection link to be rotatable, when the wearer wears the joint structure.

The fourth connection link may be located above the third connection link in the fourth rotation axis, about which the fourth connection link is coupled to the third connection link to be rotatable, when the wearer wears the joint structure.

A distance between the first rotation axis and the third rotation axis may be larger than a distance between the second rotation axis and the fourth rotation axis.

The second rotation axis may be located on a rear side of the first rotation axis and the fourth rotation axis may be located on a front side of the third rotation axis when the wearer wears the joint structure.

The second connection link may have a shape that is curved to surround a shoulder of the wearer because it is located on a lower side as it goes from the first rotation axis to the third rotation axis when the wearer wears the joint structure.

The third connection link may have a shape that is curved to surround a shoulder of the wearer because it is located on a lower side as it goes from the second rotation axis to the fourth rotation axis when the wearer wears the joint structure.

An area of the first connection link, which extends from the first rotation axis to the second rotation axis, may have a shape curved to surround a shoulder of the wearer when the wearer wears the joint structure.

An area of the fourth connection link, which extends from the third rotation axis to the fourth rotation axis, may have a shape curved to surround a shoulder of the wearer when the wearer wears the joint structure.

The second connection link and the third connection link may be shaped such that an instantaneous center of rotation (ICR) that is perpendicular to the second connection link and the third connection link always passes through the intersection area in an area in which the second connection link and the third connection link cross each other.

The joint structure may further include an upper arm module coupled to one side of the fourth connection link to be rotatable and attached to an upper arm of the wearer, and the upper arm module may include a first upper arm part, one side of which is coupled to the fourth connection link to be rotatable about a fifth rotation axis, and a second upper arm part, one side of which is coupled to the first upper arm part to be rotatable about a sixth rotation axis.

The fifth rotation axis may extend in a vertical direction and the sixth rotation axis may extend in a horizontal direction when the wearer wears the joint structure.

According to another embodiment of the present disclosure, an exo-skeleton robot includes a joint structure coupled to a shoulder and an upper arm of a wearer and a frame, to which one side of the joint structure is coupled and which is adhered to a back of the wearer. The joint structure includes a first connection link fixed to one side of the wearer, a second connection link coupled to the first connection link to be rotatable about a first rotation axis, a third connection link coupled to the first connection link to be rotatable about a second rotation axis spaced apart from the first rotation axis, and a fourth connection link, one side of which is coupled to the second connection link to be rotatable about a third rotation axis and an opposite side of which is coupled to the third connection link to be rotatable about a fourth rotation axis spaced apart from the third rotation axis, and wherein an imaginary first extension axis obtained by extending the first rotation axis, an imaginary second extension axis obtained by extending the second rotation axis, an imaginary third extension axis obtained by extending the third rotation axis, and an imaginary fourth extension axis obtained by extending the fourth rotation axis intersect each other in one area (here, 'an intersection area').

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, a joint structure and an exo-skeleton robot according to embodiments of the present disclosure will be described with reference to the drawings.

Joint Structure

Figure 1:
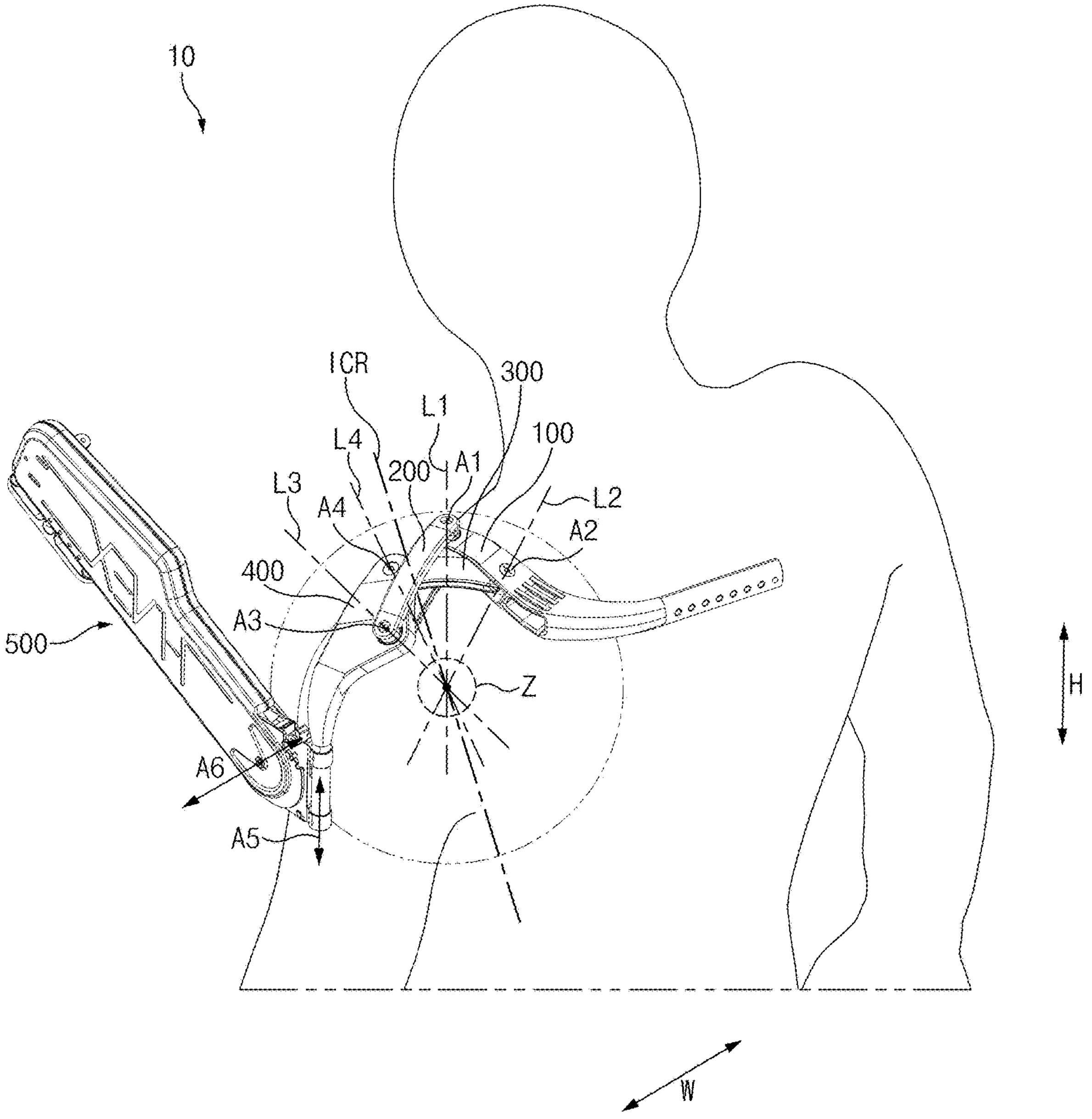
FIG. 1 is a perspective view illustrating a state in which a wearer wears a joint structure according to embodiments of the present disclosure.
Figure 2:
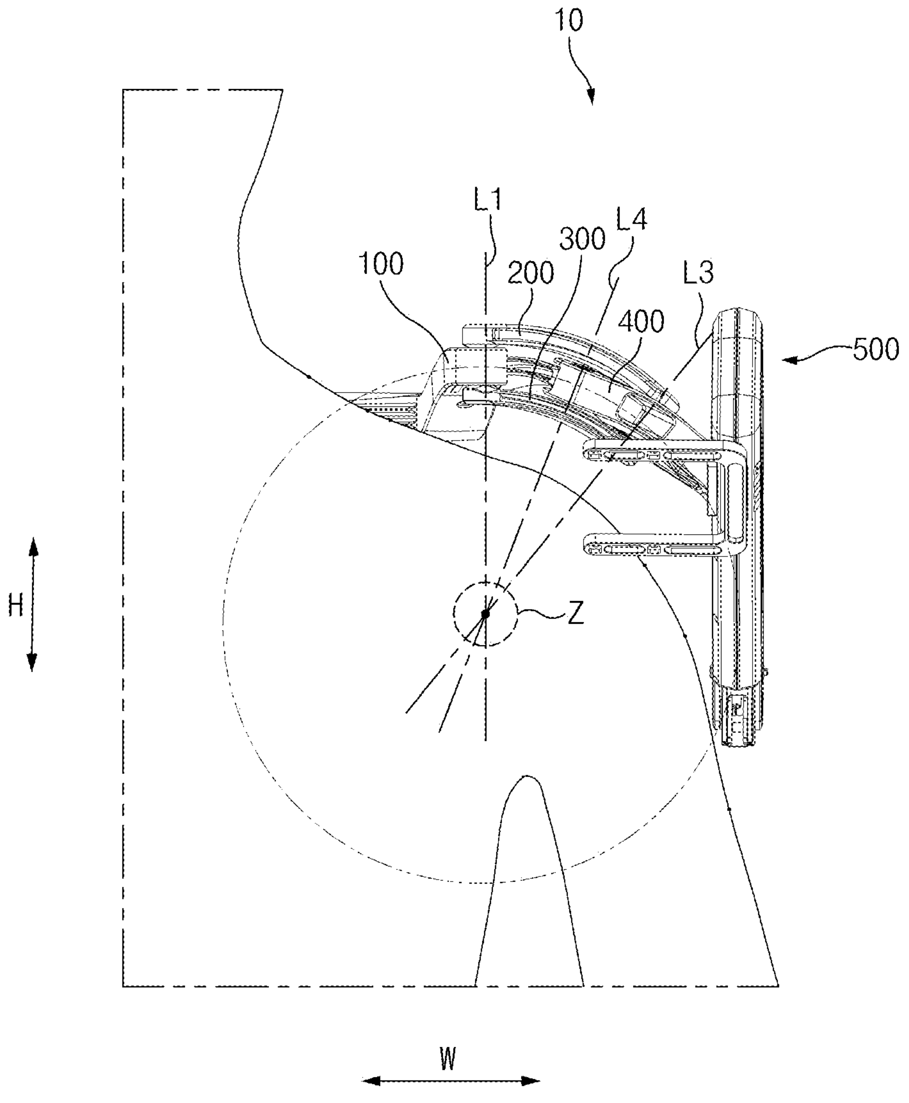
FIG. 2 is a front view illustrating a state in which a wearer wears a joint structure according to embodiments of the present disclosure.
Figure 3:
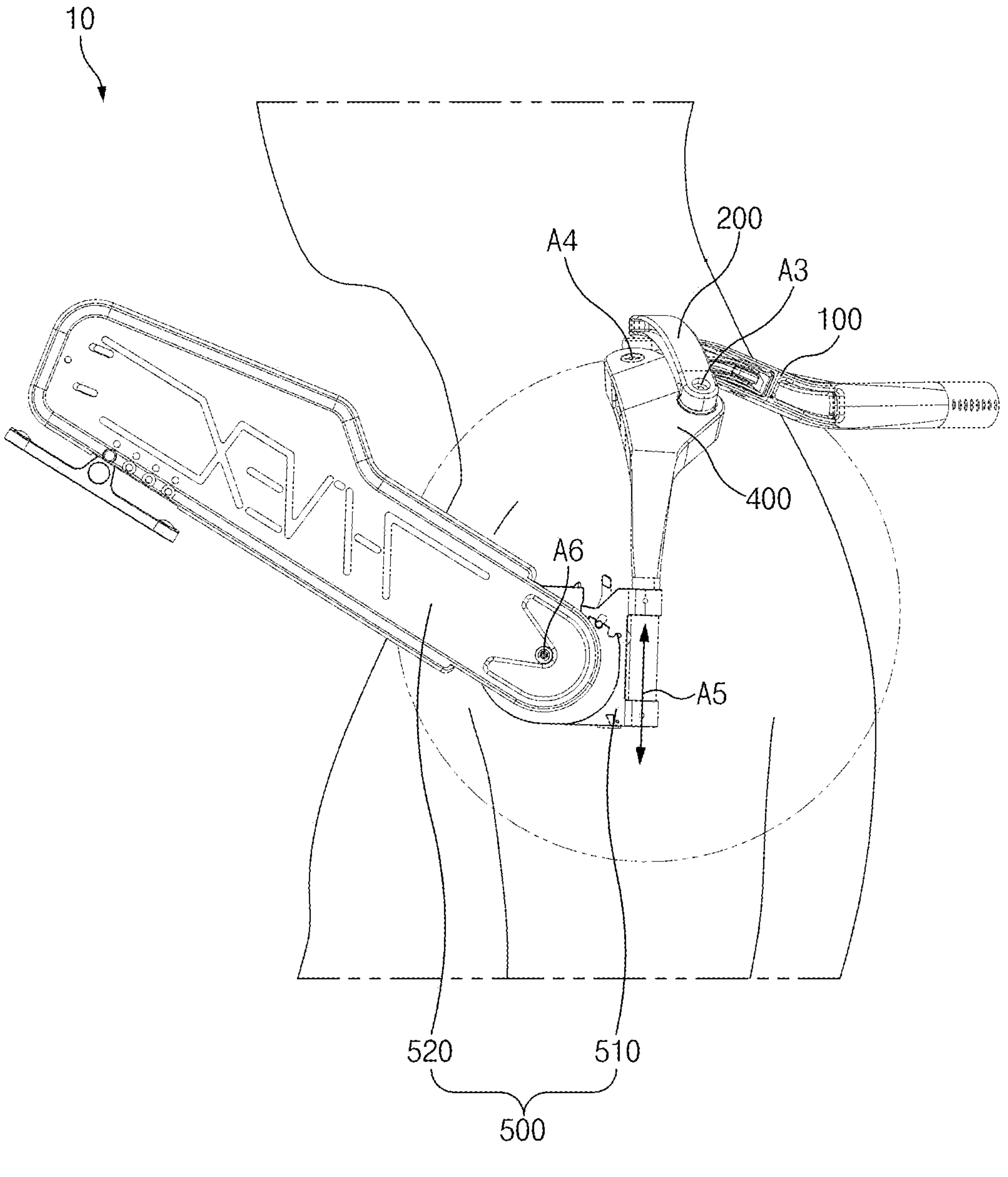
FIG. 3 is a side view illustrating a state in which a wearer wears a joint structure according to embodiments of the present disclosure.
Figure 4:
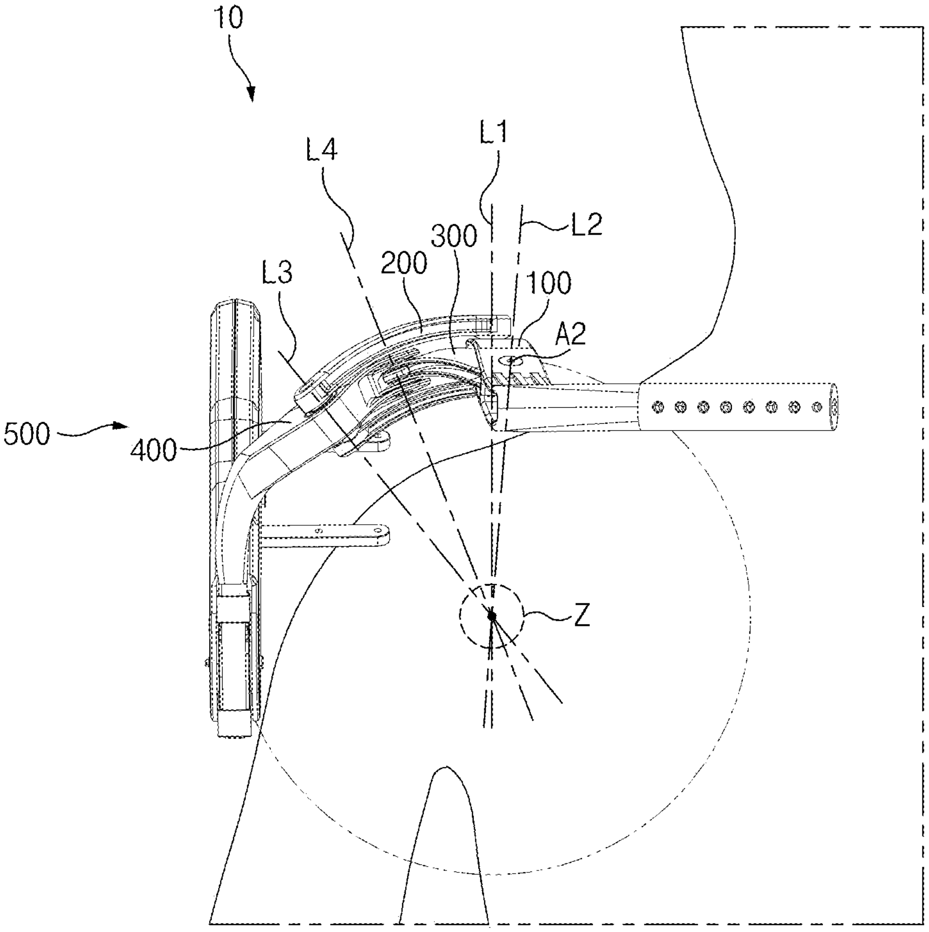
FIG. 4 is a rear view illustrating a state in which a wearer wears a joint structure according to embodiments of the present disclosure.
Figure 5:
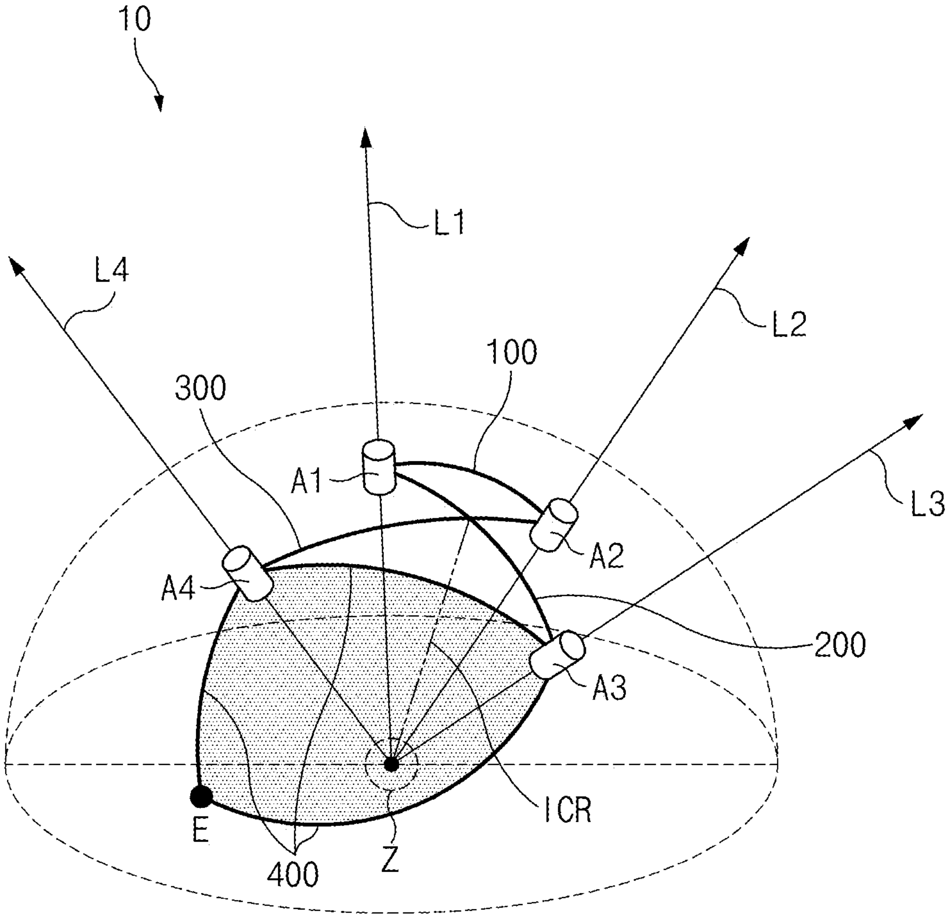
FIG. 5 is a view conceptually illustrating a joint structure according to embodiments of the present disclosure.
Figure 6:
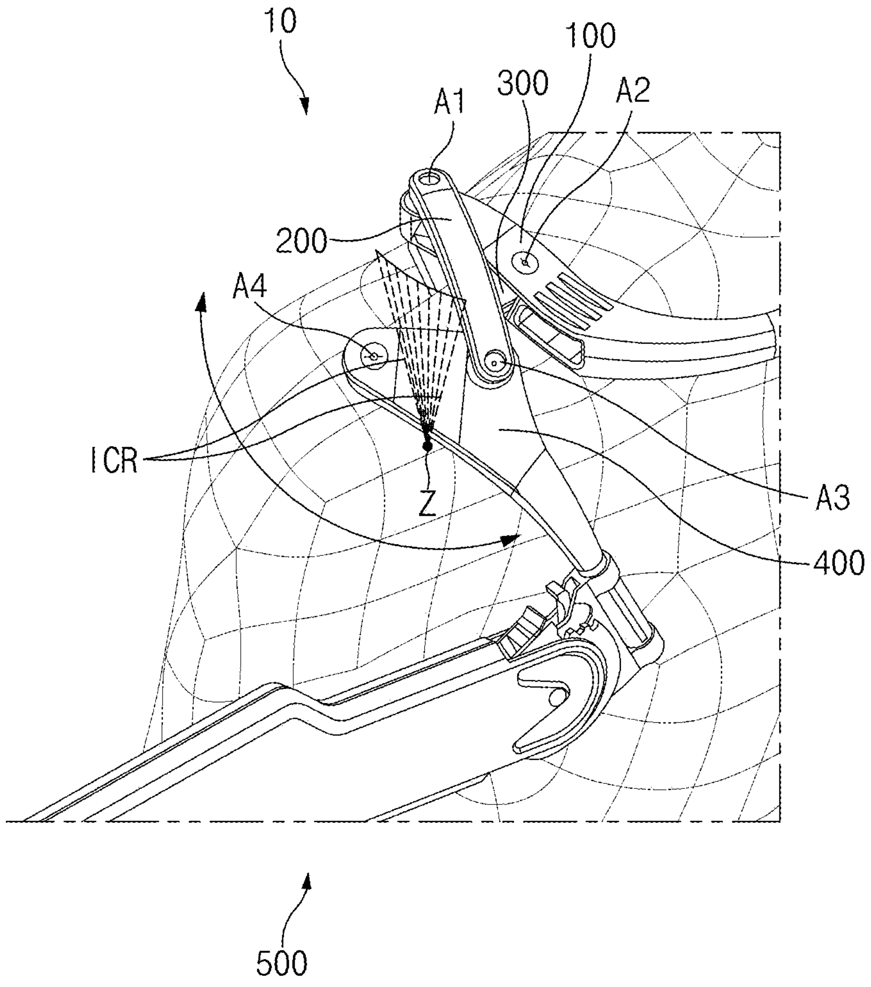
FIG. 6 is an enlarged view illustrating a joint structure according to embodiments of the present disclosure.

FIG. 1 is a perspective view illustrating a state in which a wearer wears a joint structure according to embodiments of the present disclosure. FIG. 2 is a front view illustrating a state in which a wearer wears the joint structure according to embodiments of the present disclosure. FIG. 3 is a side view illustrating a state in which a wearer wears the joint structure according to embodiments of the present disclosure. FIG. 4 is a rear view illustrating a state in which a wearer wears the joint structure according to embodiments of the present disclosure. FIG. 5 is a view conceptually illustrating the joint structure according to embodiments of the present disclosure. FIG. 6 is an enlarged view illustrating the joint structure according to embodiments of the present disclosure.

A joint structure 10 according to embodiments of the present disclosure may be a configuration that is mounted on a shoulder of a wearer. In particular, as will be described below, according to embodiments of the present disclosure, because the joint structure 10 may have a structure that may implement a motion corresponding to a 3-dimensional motion of a shoulder joint of the wearer, a sense of wearing may be remarkably enhanced.

Meanwhile, in the specification, the joint structure 10 will be described with reference to a time when the wearer wears the joint structure 10 according to a purpose of embodiments of the present disclosure for convenience of description and understanding.

As illustrated in FIGS. 1 to 6, the joint structure 10 may include a first connection link 100, to which one side of the wearer is fixed. In more detail, the first connection link 100 may be a configuration that is fixed to one side of the wearer regardless of a motion of a shoulder joint of the wearer.

Furthermore, the joint structure 10 may further include a second connection link 200 that is coupled to the first connection link 100 to be rotatable about a first rotation axis A1 and a third connection link 300 that is coupled to the first connection link 100 to be rotatable about a second rotation axis A2 that is spaced apart from the first rotation axis A1. Accordingly, according to a motion of the shoulder joint of the wearer, the second connection link 200 and the third connection link 300 may be rotated with respect to the first connection link boo.

Referring now to FIGS. 1 to 6, the joint structure 10 according to embodiments of the present disclosure may further include a fourth connection link 400, one side of which is coupled to the second connection link 200 to be rotatable about a third rotation axis A3 and an opposite side of which is coupled to the third connection link 300 to be rotatable about a fourth rotation axis A4 spaced apart from the third rotation axis A3. Accordingly, the fourth connection link 400 also may be moved according to a motion of the shoulder joint of the wearer. Meanwhile, the first to fourth rotation axes A1, A2, A3, and A4 also correspond to a single configuration of the joint structure 10.

In summary of the above-described contents, when the shoulder joint is moved while the wearer wears the joint structure 10, the second to fourth connection links 200, 300, and 400 are moved while the first connection link 100 is fixed to one side of the wearer. Then, according to embodiments of the present disclosure, the joint structure 10 may remarkably enhance a sense of wearing by implementing a motion corresponding to a 3-dimensional motion of the shoulder joint of the wearer.

To achieve the above-described features, an imaginary first extension axis L1 obtained by extending the first rotation axis A1, an imaginary second extension axis L2 obtained by extending the second rotation axis A2, an imaginary third extension axis L3 obtained by extending the third rotation axis A3, and an imaginary fourth extension axis L4 obtained by extending the fourth rotation axis A4 may intersect each other in one area "Z". In the specification, the above-described one area "Z" will be referred to as an intersection area.

Meanwhile, the intersection area "Z" described in the specification does not mean only a specific point, but may mean an imaginary area having a specific size and a specific volume. Accordingly, according to embodiments of the present disclosure, it should be understood that a feature that the first to fourth extension axes L1, L2, L3, and L4 intersect each other in the intersection area "Z" does not only mean that the first to fourth extension axes L1, L2, L3, and L4 meet each other at a specific point but also mean that the first to fourth extension axes L1, L2, L3, and L4 pass the imaginary intersection area "Z" having a specific size and a specific volume. However, it should be construed that the size and the volume of the intersection area "Z" may be limited even though the intersection area "Z" is a concept that has the specific size and the volume, but the size and the volume of the intersection area "Z" is sufficiently small enough to cause a big convenience when the shoulder joint is moved after the wearer wears the joint structure 10. This may be understood that the first to fourth extension axes L1, L2, L3, and L4 are located to be close to each other. However, most preferably, the first to fourth extension axes L1, L2, L3, and L4 may intersect each other at a specific point.

Referring now to FIGS. 1 to 6, when the wearer wears the joint structure 10, the above-described intersection area "Z" may be located on an acromioclavicular joint of the wearer, and the second connection link 200 and the third connection link 300 may intersect each other.

An area in which the second connection link 200 and the third connection link 300 intersect each other, the third rotation axis A3, and the fourth rotation axis A4 are connected to each other by the second connection link 200 and the third connection link 300. Accordingly, it may be understood that the third rotation axis A3 and the fourth rotation axis A4 are rotated about a rotation axis that passes through the area in which the second connection link 200 and the third connection link 300 intersect each other when the shape of the joint structure 10 is deformed due to a motion of the shoulder joint of the wearer.

Then, it may be seen that a central axis of rotation of the third rotation axis A3 and a central axis of rotation of the fourth rotation axis A4 are variable because a location of the area in which the second connection link 200 and the third connection link 300 intersect each other is changed as the shoulder joint of the wearer is moved. In the specification, a central axis corresponding to a central axis of rotation of the third rotation axis A3 and rotation of the fourth rotation axis A4, which pass through the area in which the second connection link 200 and the third connection link 300 cross each other, is defined as an instantaneous center of rotation (hereinafter, an 'ICR').

Then, according to embodiments of the present disclosure, the second connection link 200 and the third connection link 300 may be shaped such that an ICR that is perpendicular to the second connection link 200 and the third connection link 300 always passes through the intersection area "Z" in an area in which the second connection link 200 and the third connection link 300 cross each other. A plurality of dotted lines illustrated in FIG. 6 are ICRs, and FIG. 6 illustrates a state in which the ICRs always pass through the intersection area "Z" regardless of a change in the location of the area in which the second connection link 200 and the third connection link 300 intersect each other due to a motion of the shoulder joint of the wearer. As an example, the second connection link 200 and the third connection link 300 may have shapes corresponding to curvatures of imaginary spheres, the center of which is the acromioclavicular joint or the intersection area "Z" of the wearer.

According to embodiments of the present disclosure, because the third rotation axis A3 and the fourth rotation axis A4 revolve about the ICR that passes through the area in which the second connection link 200 and the third connection link 300 intersect each other and the intersection area "Z" when the wearer moves the shoulder joint while wearing the joint structure 10 according to embodiments of the present disclosure, the fourth connection link 400 coupled to the second connection link 200 and the third connection link 300 through the third rotation axis A3 and the fourth rotation axis A4 may be rotated about the ICR that passes through the acromioclavicular joint regardless of the motion of the shoulder joint of the wearer. Accordingly, a sense of wearing of the joint structure 10 may be maximized. In particular, as described above, the fourth connection link 400 may further include an upper arm module mounted on an upper arm of the wearer, and because the upper arm of the wearer may be smoothly moved regardless of the motion of the shoulder joint when the fourth connection link 400 is rotated about the ICR, a sense of wearing of the joint structure 10 may be maximized.

This may be because the configurations corresponding to the first to fourth connection links 100, 200, 300, and 400 are not disposed on a 2-dimensional plane but are disposed in a 3-dimensional manner in a form that surrounds the shoulder joint of the wearer. That is, unlike the above description, when the configurations corresponding to the first to fourth connection links are disposed on a 2-dimensional plane, the configuration corresponding to the first to fourth extension axes are formed in parallel to each other and the configurations corresponding to the instantaneous rotation axis also are formed in parallel to the configurations corresponding to the first to fourth extension axes. In this case, because the configurations corresponding to the instantaneous rotation axis according to embodiments of the present disclosure are spaced apart from the acromioclavicular joint of the wearer, a smooth motion of the joint structure corresponding to the motion of the shoulder joint of the wearer cannot be implemented, and as a result, a sense of wearing may be significantly decreased.

Meanwhile, according to embodiments of the present disclosure, because the first to fourth extension axes L1, L2, L3, and L4 are not parallel to each other but intersect each other in the intersection area "Z" located on the acromioclavicular joint as the first to fourth connection links 100, 200, 300, and 400 have more solid shapes on a 3-dimensional space, a motion of the joint structure 10 corresponding to the motion of the shoulder joint of the wearer may be implemented.

As described above, the first to fourth connection links 100, 200, 300, and 400 provided in the joint structure 10 according to embodiments of the present disclosure may have solid shapes instead of shapes that are simply disposed on a 2-dimensional plane.

In more detail, as illustrated in FIGS. 1 to 4, the second connection link 200 may have a shape that is curved to surround the shoulder of the wearer because it is located on a lower side as it goes from the first rotation axis A1 to the third rotation axis A3 when the wearer wears the joint structure 10, and the third connection link 300 may have a shape that is curved to surround the shoulder of the wearer because it is located on a lower side as it goes from the second rotation axis A2 to the fourth rotation axis A4.

Furthermore, as illustrated in FIGS. 1 to 4, when the wearer wears the joint structure 10, an area of the first connection link 100, which extends from the first rotation axis A1 to the second rotation axis A2, may have a shape that is curved to surround the shoulder of the wearer, and an area of the fourth connection link 400, which extends from the third rotation axis A3 to the fourth rotation axis A4, may have a shape that is curved to surround the shoulder of the wearer.

Hereinafter, a relative locational relationship of the first to fourth connection links 100, 200, 300, and 400 will be described with reference to the drawings. However, contents that will be described regarding the relative locational relationship of the first to fourth connection links should be regarded as an example.

As illustrated in FIGS. 1 to 4, when the wearer wears the joint structure 10, the first connection link 100 may be fixed to a rear shoulder of the wearer, and the second connection link 200 may be located above the first connection link 100 in the first rotation axis A1, in which the second connection link 200 is coupled to the first connection link 100 to be rotatable.

Furthermore, as an example, when the wearer wears the joint structure 10, the third connection link 300 may be located below the first connection link 100 in the second rotation axis A2, in which the third connection link 300 is coupled to the first connection link 100 to be rotatable. That is, according to embodiments of the present disclosure, the second connection link 200 and the third connection link 300 may be spaced apart from each other by a specific interval in the vertical direction "H" while the first connection link 100 is interposed therebetween.

Referring now to FIGS. 1 to 4, as an example, when the wearer wears the joint structure 10, the fourth connection link 400 may be located below the second connection link 200 in the third rotation axis A3, in which the fourth connection link 400 is coupled to the second connection link 200 to be rotatable, and the fourth connection link 400 may be located above the third connection link 300 in the fourth rotation axis A4, in which the fourth connection link 400 is coupled to the third connection link 300 to be rotatable. That is, according to embodiments of the present disclosure, the second connection link 200 and the third connection link 300 may be spaced apart from each other by a specific interval in the vertical direction "H" while the fourth connection link 400 is interposed therebetween.

Meanwhile, as an example, a distance between the first rotation axis A1 and the third rotation axis A3 may be larger than a distance between the second rotation axis A2 and the fourth rotation axis A4. However, unlike this, a distance between the first rotation axis A1 and the third rotation axis A3 may be smaller than a distance between the second rotation axis A2 and the fourth rotation axis A4, and the two distances may be the same.

Furthermore, as described above, the second connection link 200 and the third connection link 300 may intersect each other. To achieve this, as illustrated in FIGS. 1 to 6, the second rotation axis A2 may be located on a rear side of the first rotation axis A1, and the fourth rotation axis A4 may be located on a front side of the third rotation axis A3.

Meanwhile, the joint structure 10 according to embodiments of the present disclosure may further include an upper arm module 500 that is coupled to one side of the fourth connection link 400 to be rotatable and is adhered to the upper arm of the wearer. The upper arm module 500 may be a configuration that provides a force for assisting a motion of the upper arm with respect to the shoulder of the wearer.

The upper arm module 500 may include a first upper arm part 510, one side of which is coupled to the fourth connection link 400 to be rotatable about a fifth rotation axis M, and a second upper arm part 520, one side of which is coupled to the first upper arm part 510 to be rotatable about a sixth rotation axis A6. Then, the second upper arm part 520 may be adhered to the upper arm of the wearer.

The first upper arm part 510 may be configured such that the upper arm is rotatable with respect to the shoulder of the wearer in the horizontal direction, and the second upper arm part 520 may be configured such that the upper arm is rotatable with respect to the shoulder of the wearer in the vertical direction.

To achieve the above-described features, when the joint structure 10 is worn, the fifth rotation axis A5 may extend in the vertical direction "H" and the sixth rotation axis A6 may extend in the horizontal direction "W". Then, the upper arm module 500 may further include a muscular force assisting part (not illustrated) that assists a force that is necessary for raising the upper arm by the wearer in a working process by providing a force that is necessary for rotating the second upper arm part 520 with respect to the first upper arm part 510 in the sixth rotation axis A6 as the first upper arm part 510 and the second upper arm part 520 are coupled to each other. The muscular force assisting part may be a configuration that actively provides an assistant force by using a power source, such as a motor, and may be a configuration that has a specific link structure to passively provide a variable assistant force according to a posture of the wearer.

Exo-Skeleton Robot

Figure 7:
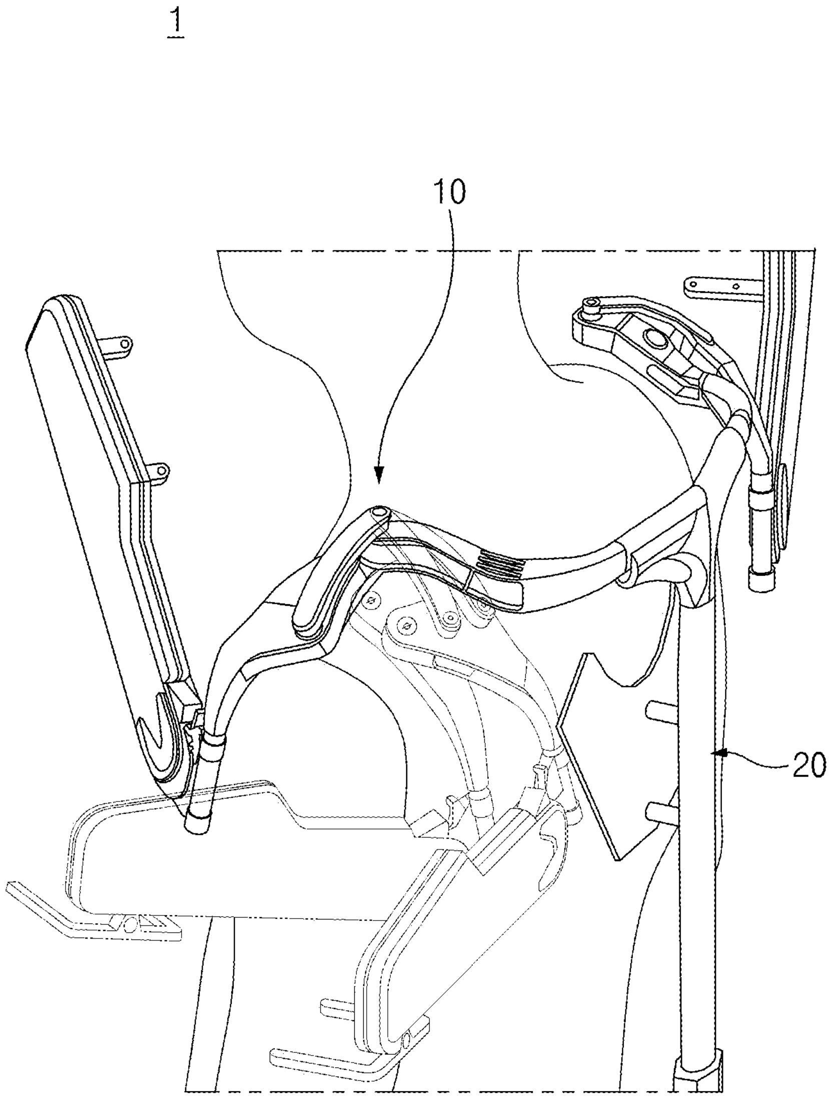
FIG. 7 is a view illustrating a motion of a joint structure in an exo-skeleton robot according to embodiments of the present disclosure.

FIG. 7 is a view illustrating a motion of a joint structure in an exo-skeleton robot according to embodiments of the present disclosure.

Referring to FIGS. 1 to 7, an exo-skeleton robot 1 according to embodiments of the present disclosure may include the joint structure 10 coupled to a shoulder and an upper arm of the wearer and a frame 20, to which one side of the joint structure 10 is coupled and which is adhered to the back of the wearer.

The joint structure 10 may include the first connection link 100 fixed to one side of a wearer, the second connection link 200 coupled to the first connection link 100 to be rotatable about the first rotation axis A1, the third connection link 300 coupled to the first connection link 100 to be rotatable about the second rotation axis A2 spaced apart from the first rotation axis A1, and the fourth connection link 400, one side of which is coupled to the second connection link 200 to be rotatable about the third rotation axis A3 and an opposite side of which is coupled to the third connection link 300 to be rotatable about the fourth rotation axis A4 spaced apart from the third rotation axis A3.

Then, the imaginary first extension axis L1 obtained by extending the first rotation axis A1, the imaginary second extension axis L2 obtained by extending the second rotation axis A2, the imaginary third extension axis L3 obtained by extending the third rotation axis A3, and the imaginary fourth extension axis L4 obtained by extending the fourth rotation axis A4 may intersect each other in one area (hereinafter, an 'intersection area').

Meanwhile, the frame 20 may be a configuration which is adhered to the back of the wearer while supporting the back of the wearer and to which the first connection link 100 of the joint structure 10 is fixedly coupled.

According to embodiments of the present disclosure, an exo-skeleton robot that has an ergonomic structure by implementing a motion that interworks a motion of a shoulder joint of a user may be provided.

Although it is apparent that the present disclosure has been described with reference to the limited embodiments and the drawings, the present disclosure is not limited thereto, and the present disclosure may be variously carried out by an ordinary person in the art within the technical spirit of the present disclosure and the equivalent ranges of the claims.

What is claimed is:

1. A joint structure comprising:

a first connection link configured to be fixed to one side of a wearer;

a second connection link coupled to the first connection link to be rotatable about a first rotation axis;

a third connection link coupled to the first connection link to be rotatable about a second rotation axis spaced apart from the first rotation axis; and a fourth connection link, a first side of which is coupled to the second connection link to be rotatable about a third rotation axis and a second side of which is coupled to the third connection link to be rotatable about a fourth rotation axis spaced apart from the third rotation axis; and wherein an imaginary first extension axis obtained by extending the first rotation axis, an imaginary second extension axis obtained by extending the second rotation axis, an imaginary third extension axis obtained by extending the third rotation axis, and an imaginary fourth extension axis obtained by extending the fourth rotation axis intersect each other in an intersection area.

2. The joint structure of claim 1, wherein the second connection link and the third connection link intersect each other.

3. The joint structure of claim 1, wherein the first connection link is configured to be fixed to a shoulder of the wearer on a rear surface thereof when worn by the wearer.

4. The joint structure of claim 1, wherein the intersection area is located on an acromioclavicular joint of the wearer when the joint structure is worn by the wearer.

5. The joint structure of claim 1, wherein the second connection link is located above the first connection link in the first rotation axis about which the second connection link is coupled to the first connection link to be rotatable when the joint structure is worn by the wearer.

6. The joint structure of claim 1, wherein the third connection link is located below the first connection link in the second rotation axis about which the third connection link is coupled to the first connection link to be rotatable when the joint structure is worn by the wearer.

7. The joint structure of claim 1, wherein the fourth connection link is located below the second connection link in the third rotation axis about which the fourth connection link is coupled to the second connection link to be rotatable when the joint structure is worn by the wearer.

8. The joint structure of claim 1, wherein the fourth connection link is located above the third connection link in the fourth rotation axis about which the fourth connection link is coupled to the third connection link to be rotatable when the joint structure is worn by the wearer.

9. The joint structure of claim 1, wherein a distance between the first rotation axis and the third rotation axis is larger than a distance between the second rotation axis and the fourth rotation axis.

10. The joint structure of claim 1, wherein the second rotation axis is located on a rear side of the first rotation axis and the fourth rotation axis is located on a front side of the third rotation axis when the joint structure is worn by the wearer.

11. The joint structure of claim 1, wherein the second connection link has a shape that is curved to surround a shoulder of the wearer as it is located on a lower side as it goes from the first rotation axis to the third rotation axis when the joint structure is worn by the wearer.

12. The joint structure of claim 1, wherein the third connection link has a shape that is curved to surround a shoulder of the wearer as it is located on a lower side as it goes from the second rotation axis to the fourth rotation axis when the joint structure is worn by the wearer.

13. The joint structure of claim 1, wherein an area of the first connection link which extends from the first rotation axis to the second rotation axis has a shape curved to surround a shoulder of the wearer when the joint structure is worn by the wearer.

14. The joint structure of claim 1, wherein an area of the fourth connection link which extends from the third rotation axis to the fourth rotation axis has a shape curved to surround a shoulder of the wearer when the joint structure is worn by the wearer.

15. The joint structure of claim 1, wherein the second connection link and the third connection link are shaped such that an instantaneous center of rotation that is perpendicular to the second connection link and the third connection link always passes through the intersection area in an area in which the second connection link and the third connection link cross each other.

16. A joint structure comprising:

a first connection link configured to be fixed to one side of a wearer;

a second connection link coupled to the first connection link to be rotatable about a first rotation axis;

a third connection link coupled to the first connection link to be rotatable about a second rotation axis spaced apart from the first rotation axis; and a fourth connection link, a first side of which is coupled to the second connection link to be rotatable about a third rotation axis and a second side of which is coupled to the third connection link to be rotatable about a fourth rotation axis spaced apart from the third rotation axis; and an upper arm module coupled to one side of the fourth connection link to be rotatable and configured to be attached to an upper arm of the wearer, wherein the upper arm module comprises:

a first upper arm part, one side of which is coupled to the fourth connection link to be rotatable about a fifth rotation axis; and a second upper arm part, one side of which is coupled to the first upper arm part to be rotatable about a sixth rotation axis; and wherein an imaginary first extension axis obtained by extending the first rotation axis, an imaginary second extension axis obtained by extending the second rotation axis, an imaginary third extension axis obtained by extending the third rotation axis, and an imaginary fourth extension axis obtained by extending the fourth rotation axis intersect each other in an intersection area.

17. The joint structure of claim 16, wherein the fifth rotation axis extends in a vertical direction and the sixth rotation axis extends in a horizontal direction when the joint structure is worn by the wearer.

18. An exo-skeleton robot comprising:

a frame configured to be adhered to a back of a wearer; and a joint structure having one side coupled to the frame, wherein the joint structure is configured to be coupled to a shoulder and an upper arm of the wearer, and wherein the joint structure comprises:

a first connection link configured to be fixed to one side of the wearer;

a second connection link coupled to the first connection link to be rotatable about a first rotation axis;

a third connection link coupled to the first connection link to be rotatable about a second rotation axis spaced apart from the first rotation axis; and a fourth connection link, one side of which is coupled to the second connection link to be rotatable about a third rotation axis and an opposite side of which is coupled to the third connection link to be rotatable about a fourth rotation axis spaced apart from the third rotation axis; and wherein an imaginary first extension axis obtained by extending the first rotation axis, an imaginary second extension axis obtained by extending the second rotation axis, an imaginary third extension axis obtained by extending the third rotation axis, and an imaginary fourth extension axis obtained by extending the fourth rotation axis intersect each other in an intersection area.

19. The exo-skeleton robot of claim 18, wherein the second connection link and the third connection link intersect each other.

20. The exo-skeleton robot of claim 18, wherein the intersection area is located on an acromioclavicular joint of the wearer when the joint structure is worn by the wearer.

* * * * *